(12) United States Patent
Hsu

(10) Patent No.: US 6,425,688 B1
(45) Date of Patent: Jul. 30, 2002

(54) INFRARED TEMPERATURE WAVE GUIDE DEVICE

(75) Inventor: Yi-Shou Hsu, Chu Pei (TW)

(73) Assignee: Actherm Inc., Hsinchu Hsien (TW)

( * ) Notice: Subject to any disclaimer, the term of this patent is extended or adjusted under 35 U.S.C. 154(b) by 0 days.

(21) Appl. No.: 09/553,750

(22) Filed: Apr. 21, 2000

(51) Int. Cl.[7] ................................................. G01J 5/00
(52) U.S. Cl. ........................ 374/131; 374/132; 374/133
(58) Field of Search ................................. 374/130, 131, 374/132, 133, 121, 208

(56) References Cited

U.S. PATENT DOCUMENTS

| 5,012,813 A | * | 5/1991 | Pompei et al. | 374/130 |
|---|---|---|---|---|
| 5,167,235 A | * | 12/1992 | Seacord et al. | 374/131 |
| 5,293,877 A | * | 3/1994 | O'Hara et al. | 374/133 |
| 5,368,038 A | * | 11/1994 | Fraden | 374/131 |
| 5,381,796 A | * | 1/1995 | Pompei | 374/131 |
| 5,628,323 A | * | 5/1997 | Pompei | 374/130 |
| 5,871,279 A | * | 2/1999 | Mooradian et al. | 374/130 |
| 6,102,564 A | * | 8/2000 | Egawa | 374/131 |
| 6,109,782 A | * | 8/2000 | Fukura et al. | 374/131 |
| 6,152,595 A | * | 11/2000 | Beerwerth et al. | 374/131 |
| 6,155,712 A | * | 12/2000 | Egawa | 374/126 |
| 6,186,959 B1 | * | 2/2001 | Canfield et al. | 600/559 |
| 6,190,041 B1 | * | 2/2001 | Huang et al. | 374/131 |
| 6,195,581 B1 | * | 2/2001 | Beerwerth et al. | 600/474 |
| 6,203,193 B1 | * | 3/2001 | Egawa | 374/126 |
| 6,224,256 B1 | * | 5/2001 | Bala | 374/158 |
| 6,238,089 B1 | * | 5/2001 | Vodzak et al. | 374/121 |
| 6,272,375 B1 | * | 8/2001 | Katzir et al. | 600/200 |

* cited by examiner

Primary Examiner—Diego Gutierrez
Assistant Examiner—Yaritza Guadalupe
(74) Attorney, Agent, or Firm—Rosenberg, Klein & Lee

(57) ABSTRACT

An infrared temperature wave guide device that is adapted for use in all kinds of precision detecting and temperature sensing apparatus directed to apply in a contact or non-contact manner measuring, control, recording, monitoring, and inspecting on a temperature source to be measured, the structure including a wave guide tube, a housing accommodating a thermopile, a thermistor, and a circuit board, and a rear cap for securing purposes. A front end of the wave guide tube is provided with a cover to prevent entry of dusts. The housing and rear cap are formed from plastic material. The connection of the housing and the rear cap is suitably adjustable to allow mounting of different thermopiles. The structure as a whole is durable, light and compact, and has longer service life, preferred anti-oxidization capability. Besides, it ensures stable quality during mass production and is easy to process.

12 Claims, 5 Drawing Sheets

INFRARED TEMPERATURE WAVE GUIDE DEVICE

BACKGROUND OF THE INVENTION (a) Field of the Invention

The present invention relates to an infrared temperature wave guide device.

(b) Description of the Prior Art

Relatively advanced temperature sensing apparatuses, such as pistol-shaped ear temperature sensors, generally have a temperature sensing means disposed in a measuring end. The sensing means can measure temperatures in contact and non-contact manners. The principle employed thereby is mainly to induce the infrared radiation generated by the temperature of the source to be measured, to compare by means of an infrared temperature sensing element and thermistor, and to convert the measured temperature output into digital displays. A major disadvantage is that the housing of the above-mentioned apparatus is generally in the form of a tube made of metal, which is relatively heavy, costly, and bulky. Besides, its oxidation-proof effect is poor; the infrared temperature sensing element cannot be replaced at will; the speed of sensing and measuring is slow, etc.

SUMMARY OF THE INVENTION

A primary object of the present invention is to provide an infrared temperature wave guide device that is light and compact, and that has longer service life and preferred anti-oxidation capability, and that is easy to process.

Another object of the present invention is to provide an infrared temperature wave guide device that can prevent entry of dusts therein.

A further object of the present invention is to provide an infrared temperature wave guide device that can accommodate a thermopile of different brands and different models.

In order to achieve the above-mentioned objects, an infrared temperature wave guide device of the present invention includes a wave guide tube, a housing accommodating a thermopile, a thermistor, and a circuit board, and a rear cap for securing purposes. A front end of the wave guide tube is provided with a cover to prevent entry of dusts. The housing and rear cap are formed from plastic material. The connection of the housing and the rear cap is suitably adjustable to allow mounting of different thermopiles.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts. Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 1:
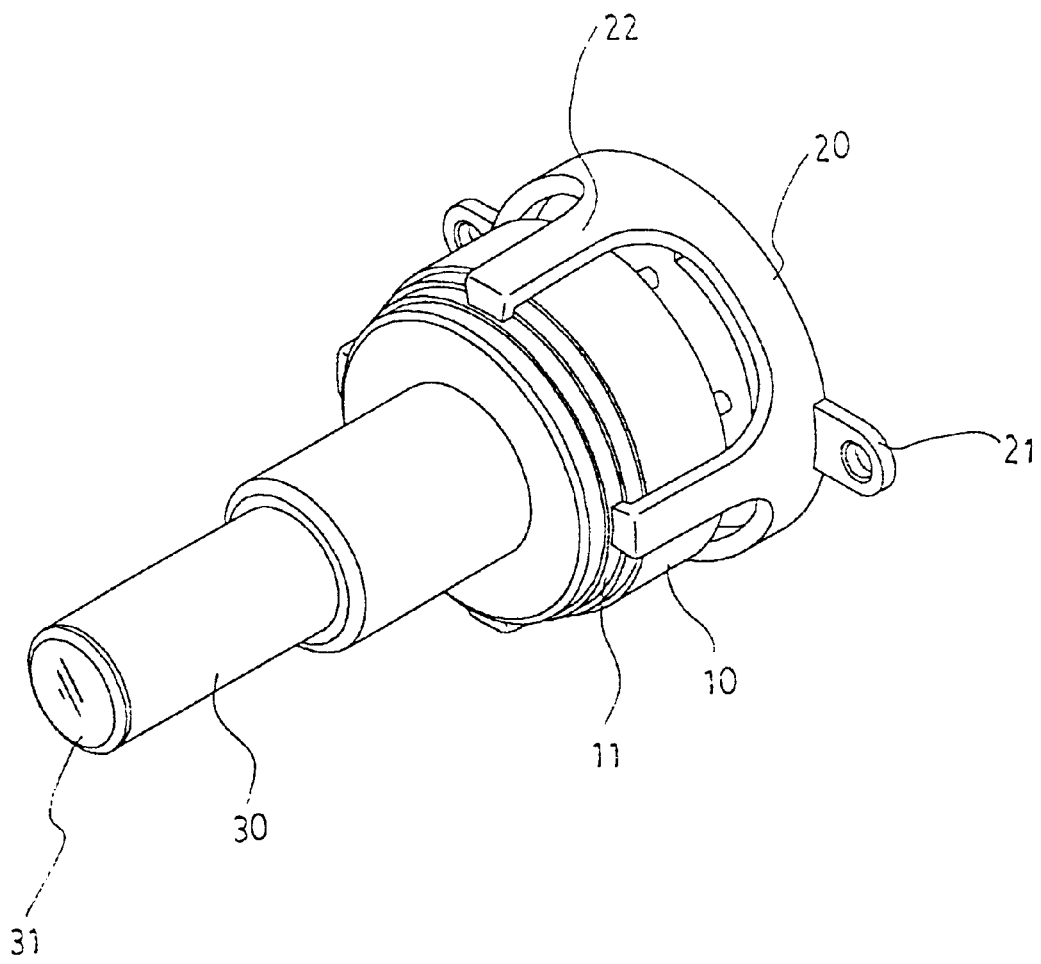
FIG. 1 is a perspective schematic view of the present invention.
Figure 2:
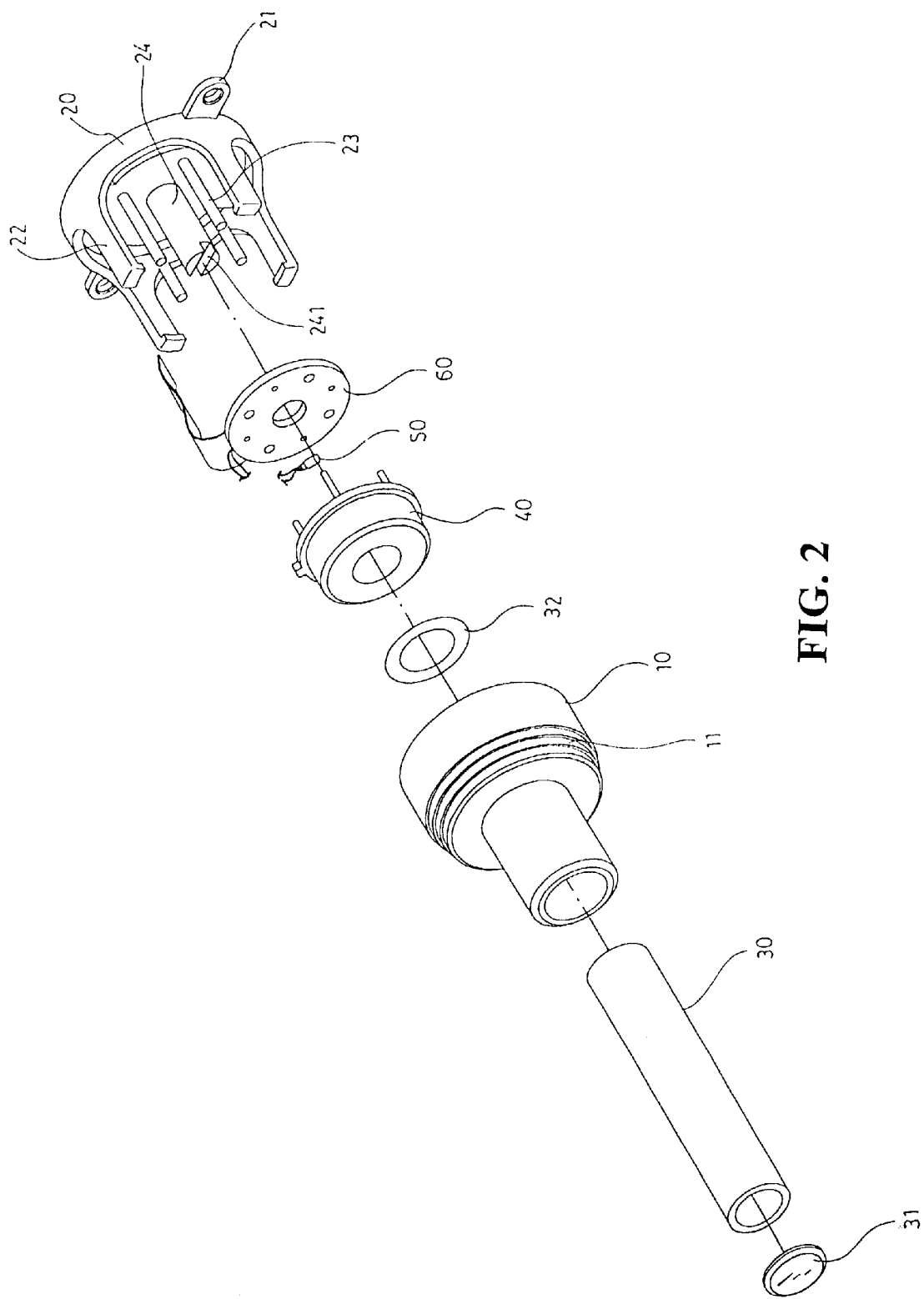
FIG. 2 is an exploded perspective view of the present invention.
Figure 3:
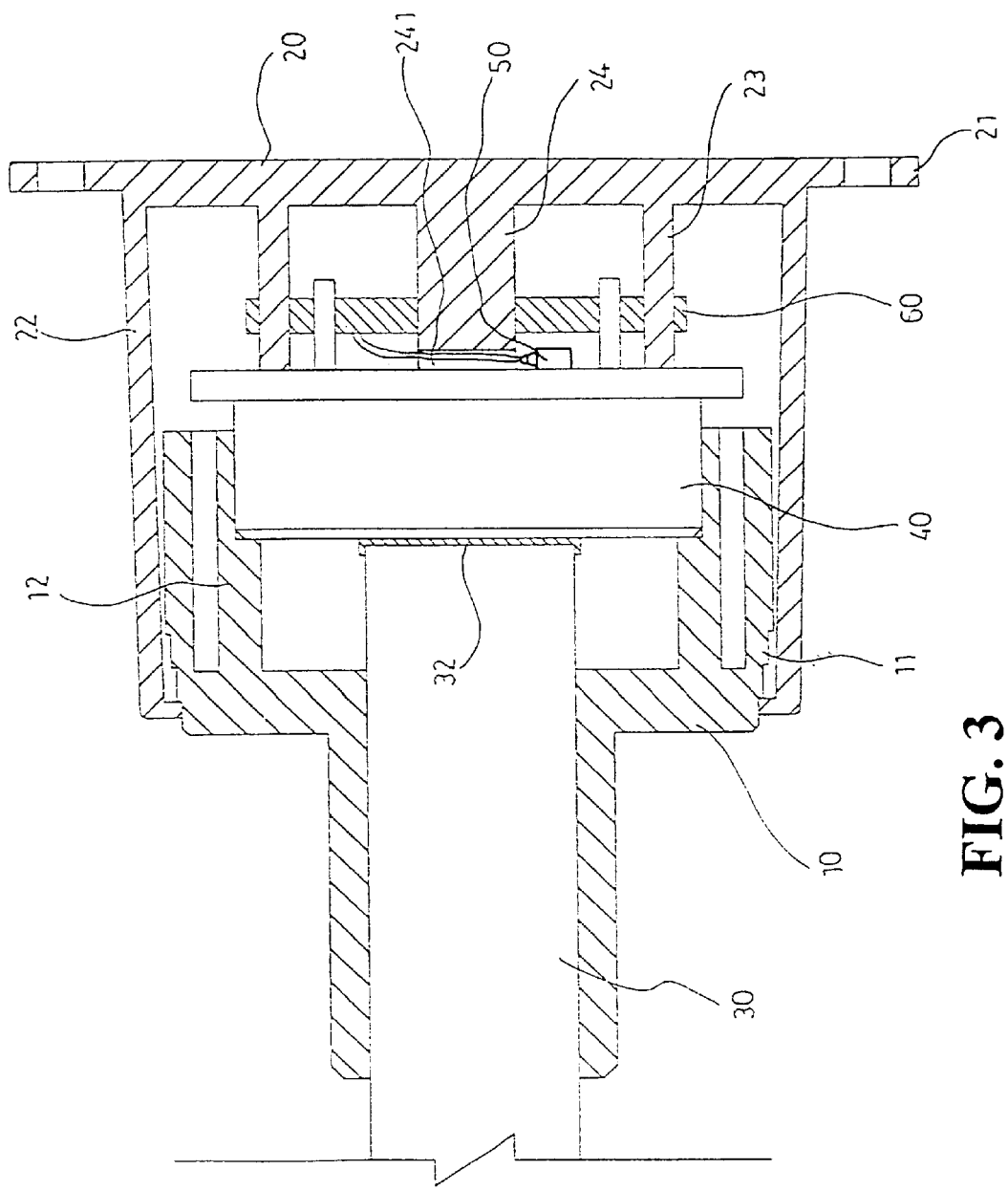
FIG. 3 is an assembled sectional schematic view of the present invention.
Figure 4:
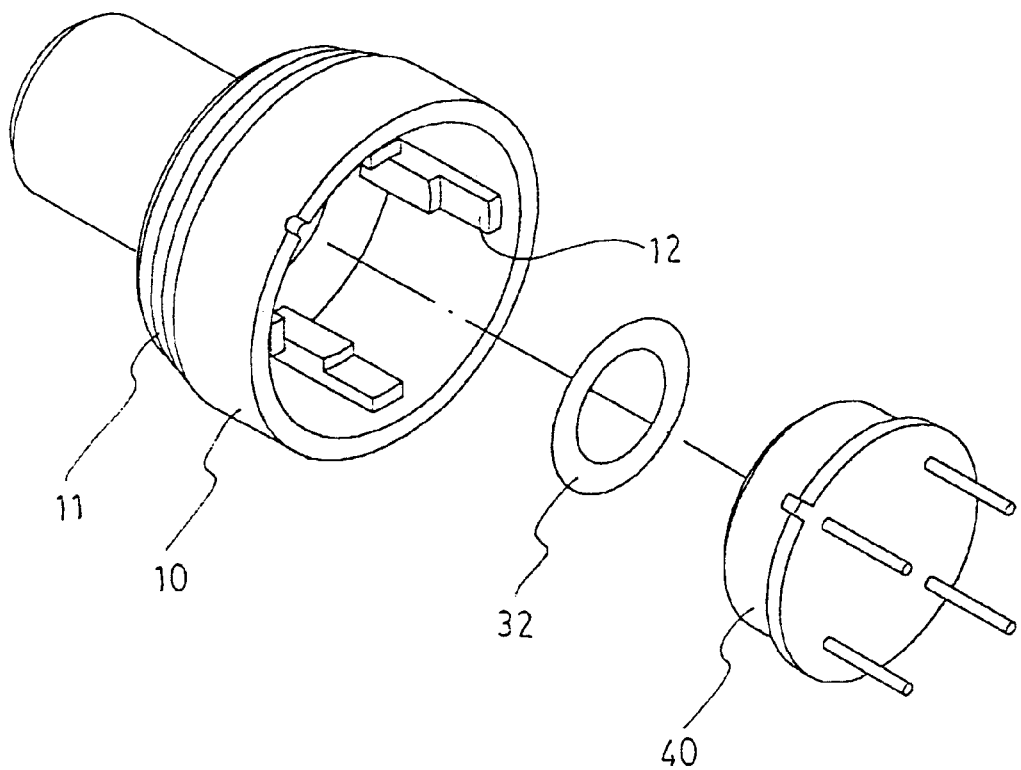
FIG. 4 is a schematic view illustrating the structure of a housing of the present invention from the back.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

With reference to FIGS. 1 to 4, the present invention includes a housing 10. A rear portion thereof has a larger diameter and provided with a plurality of retaining steps 11 for inter-engagement with a rear cap 20. Both sides of the rear cap 20 have projecting mounting lugs 21 with securing holes for passage of securing elements for securing purposes. The rear cap 20 is further provided with symmetrical retaining columns 22. Since the housing 10 and the rear cap 20 are both formed from plastic material, the retaining columns 22 are resilient and flexible to enable the front end to be retained on any one of the retaining steps 11 so as to allow adjustment of the space confined between the housing 10 and the rear cap 20 for replacement of a thermopile provided in the housing 10. The front end of the housing 10 having a smaller diameter is fitted with a wave guide tube 30 also formed from plastic material. The wave guide tube 30 is oriented towards the source of temperature to be measured and is capable of introducing the infrared generated by the temperature to be measured. A front opening portion of the wave guide tube 30 is provided with a transparent cover 31 (which may be formed from plastic material) to prevent entry of dusts into the wave guide tube 30. Apart from having the housing 10, the rear cap 20, and the wave guide tube 30 formed from plastic material as a whole, the outer and inner surfaces thereof are provided with metallic layers by means of electroplating, printing, adhering, etc., to produce many functions.

In the housing 10, there are provided a plurality of symmetrical L-shaped securing mounts 12 for securing a thermopile 40. A front end of the thermopile 40 contacts the wave guide tube 30. A packing ring 32 is provided between the thermopile 40 and the wave guide tube to achieve tight connection for reception of infrared. After assembly of the housing 10 and the rear cap 20, retaining posts 23 and a central cylindrical post 24 inside the rear cap 20 just abut against the thermopile 40 to achieve firm connection and prevent loosening. The lead wire of a thermistor 50 is placed at a notch 241 formed at an upper end of the cylindrical post 24 to be pressed in position and to detect ambient temperature changes. A printed circuit board 60 is fitted onto the retaining posts 23, and the electrical signal connecting legs of the thermopile 40 and the thermistor 50 are soldered. By means of the electrically conductive copper foil on the circuit board 60, the measured temperature changes can be outputted to outside of the present invention.

By means of the construction of the housing 10 and the rear cap 20, the thermopile 40 inside the housing 10 can be replaced by one of a different brand and a different model. As for the space confined between the housing 10 and the rear cap 20, it utilizes convection of air to enable the thermistor 50 in the housing 10 to achieve an ambient temperature balance. In other words, the thermistor 50 can uniformly sense temperatures to permit quick detection of ambient temperature changes so that the measurement is precise and accurate.

Figure 5:
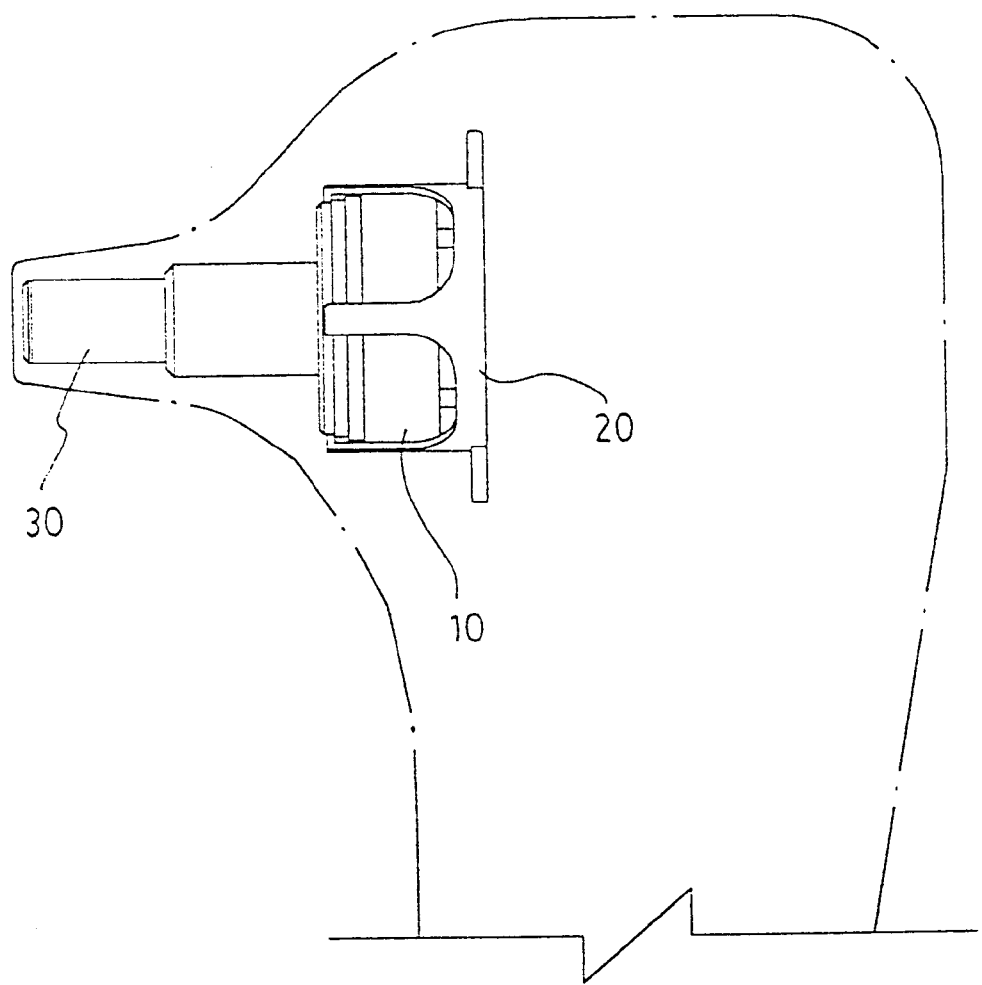
FIG. 5 is a schematic view illustrating the present invention installed in a pistol-shaped ear temperature sensor.

Referring to FIG. 5, in actual use, the present invention may be installed in a pistol-shaped temperature sensing device to quickly measure temperatures in a contact or non-contact manner.

In view of the aforesaid, the present invention at least has the following advantages:

(1) Use of new material and new manufacturing method to replace the prior art that totally employs metal.
(2) The wave guide tube, housing, and rear cap of the present invention are formed from plastic material with outer surfaces coated with a metallic layer. Compared with the prior art that totally employs metal, the present invention has longer service life and preferred anti-oxidation capability.
(3) The present invention is light and compact and can therefore allow reduction of the size of products and increase room for product design.
(4) The surface of the wave guide tube of the present invention has preferred smoothness over the prior art and allows consistent quality during mass production.
(5) The present invention is easy to process and can be made to order into different sizes.
(6) The cost is in direct proportion to quality.
(7) Mineral reserves of the earth can be saved.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. An infrared temperature sensing apparatus comprising:
   (a) a housing having an axially extended base portion defining an inner space, said housing having formed externally thereon a plurality of annular retaining steps axially offset one from the others;
   (b) a wave guide tube projecting coaxially from said housing, said wave guide tube including a transparent cover disposed at an outer free end thereof;
   (c) a temperature sensing device disposed in said inner space of said housing; and,
   (d) a rear cap adjustably coupled to said housing for substantially enclosing said inner space, said rear cap having a rear end portion and a plurality of resilient retaining columns extending transversely therefrom to releasably engage a selective one of said retaining steps;
   each of said housing, wave guide, and rear cap being formed of a plastic material having a metallic surface layer.

2. The infrared temperature sensing apparatus as recited in claim 1 further comprising a circuit board disposed in said inner space of said housing, said circuit board having said temperature sensing device coupled thereto.

3. The infrared temperature sensing apparatus as recited in claim 2 wherein said temperature sensing device includes a thermopile.

4. The infrared temperature sensing apparatus as recited in claim 3 wherein said waveguide tube includes an inner free end disposed in said inner space of said housing, said thermopile capturing coaxially against said inner free end of said waveguide tube an annular packing ring.

5. The infrared temperature sensing apparatus as recited in claim 3 wherein said base portion of said housing includes a plurality of substantially L-shaped securing mounts extending axially into said inner space, each said securing mount supportingly engaging a portion of said thermopile.

6. The infrared temperature sensing apparatus as recited in claim 5 wherein said rear cap includes a plurality of retaining posts extending transversely from said rear end portion, said retaining posts each passing through said circuit board to supportingly engage said thermopile.

7. The infrared temperature sensing apparatus as recited in claim 6 wherein a plurality of electrical signal connecting legs extending from said thermopile are soldered to said circuit board.

8. The infrared temperature sensing apparatus as recited in claim 2 wherein said temperature sensing device includes a thermistor.

9. The infrared temperature sensing apparatus as recited in claim 2 comprising a plurality of said temperature sensing devices, said temperature sensing devices including a thermopile and a thermistor.

10. The infrared temperature sensing apparatus as recited in claim 9 wherein said rear cap includes a plurality of retaining posts extending transversely from said rear end portion, said retaining posts each passing through said circuit board to supportingly engage said thermopile.

11. The infrared temperature sensing apparatus as recited in claim 10 wherein said rear cap includes a central cylindrical post extending transversely from said rear end portion, said central cylindrical post having a terminal end passing through said circuit board, said terminal end having formed therein a notch receiving said thermistor.

12. The infrared temperature sensing apparatus as recited in claim 1 wherein said rear cap includes a plurality of mounting lugs extending radially from said rear end portion, each said mounting lug having a securing hole formed therethrough for mounting to a support surface.

* * * * *